United States Patent
Kim

(10) Patent No.: US 6,556,771 B1
(45) Date of Patent: Apr. 29, 2003

(54) BROADCAST PROGRAM RESERVE-RECORDING APPARATUS USING A REMOTE TRANSCEIVER

(75) Inventor: Yong-Ho Kim, Kyungki-do (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/087,832

(22) Filed: Jun. 1, 1998

(30) Foreign Application Priority Data

May 31, 1997 (KR) .......................................... 97/22434

(51) Int. Cl.⁷ .............................. H04N 5/91; H04N 5/44
(52) U.S. Cl. ......................................... 386/83; 348/734
(58) Field of Search ........................... 386/83; 348/906, 348/734; 725/58, 39, 133, 141, 153, 80, 81

(56) References Cited

U.S. PATENT DOCUMENTS

| | | | |
|---|---|---|---|
| 5,065,235 A | * 11/1991 | Iijima | 348/734 |
| 5,256,254 A | 10/1993 | Kutaragi | |
| 5,270,829 A | 12/1993 | Yang | |
| 5,293,357 A | 3/1994 | Hallenbeck | |
| 5,406,558 A | * 4/1995 | Rovira et al. | 348/734 |
| 5,410,367 A | * 4/1995 | Zahavi et al. | 348/906 |
| 5,479,267 A | 12/1995 | Hashimoto | |
| 5,499,102 A | 3/1996 | Hashimoto | |
| 5,638,050 A | * 6/1997 | Sacca et al. | 340/539 |
| 5,646,603 A | 7/1997 | Nagata et al. | |
| 5,657,414 A | 8/1997 | Lett et al. | |
| 5,682,456 A | 10/1997 | Ishiguchi et al. | |
| 5,692,214 A | 11/1997 | Levine | |
| 5,710,605 A | * 1/1998 | Nelson | 348/906 |
| 5,734,413 A | * 3/1998 | Lappington et al. | 725/141 |
| 5,949,954 A | * 9/1999 | Young et al. | 386/83 |
| 6,040,829 A | * 5/2000 | Croy et al. | 348/906 |
| 6,130,726 A | * 10/2000 | Darbee et al. | 348/906 |

FOREIGN PATENT DOCUMENTS

| | | |
|---|---|---|
| JP | 5-89557 | 4/1993 |
| JP | 8-241546 | 9/1996 |

* cited by examiner

Primary Examiner—Andrew Christensen
Assistant Examiner—Polin Chieu
(74) Attorney, Agent, or Firm—Robert E. Bushnell, Esq.

(57) ABSTRACT

A broadcast program reserve-recording apparatus receives broadcast program information contained in a broadcast signal received in a main body such as a VCR or TV, and displays the received information on a remote transceiver such as a remote controller having a display. When a user selects a desired broadcast program for reserve-recording while watching broadcast program information displayed on the remote transceiver, the reserve-recording information of the selected broadcast program is transmitted to the main body, in order to set reserve-recording. Thus, the broadcast program reserve-recording apparatus can reserve-record the broadcast program with minimum power necessary for transmission and reception of information without turning the power of the main body fully on.

27 Claims, 2 Drawing Sheets

BROADCAST PROGRAM RESERVE-RECORDING APPARATUS USING A REMOTE TRANSCEIVER

BACKGROUND OF THE INVENTION

The present invention relates to a broadcast program reserve-recording apparatus, and more particularly, to a broadcast program reserve-recording apparatus using a remote transceiver, which can set a reserve-recording of a broadcast program without turning power of a television on by using the remote transceiver having a display.

A reserve-recording function executed by using a video cassette recorder (VCR) causes inconvenience to a user to manipulate keys a number of times in order to set channels, date, start time and end time of a desired program. Thus, each broadcast station transmits a broadcast signal, together with information on program title and broadcast time to be broadcasted, that is, VPS data in case of an European broadcast system or a KBPS data in case of a Korean broadcast system, using a data format specified between each broadcast stations, so that the user can view broadcast programs more conveniently. The VCR receives broadcast program information of the VPS data or KBPS data transmitted from each broadcast station, stores the received information in a memory, displays the broadcast program information stored in the memory on a TV (television) screen, and makes a user select a desired broadcast program. The VCR changes a channel automatically according to the information on the broadcast program selected by the user, that is, a broadcast start time defined in the VPS data or KBPS data, thereby allowing a desired broadcast program to be reserve-recorded.

The following patents each disclose features in common with the present invention but do not teach or suggest the specifically recited broadcast program reserve-recording apparatus using a remote transceiver of the present invention: U.S. Pat. No. 5,479,267 to Hashimoto, entitled Device For Combining VCR And TV, U.S. Pat. No. 5,692,214 to Levine, entitled System For Unattended Recording Of Video Programs By Remote Control Code Transmitter Module Which Receives User Selections From A Personal Computer, U.S. Pat. No. 5,257,254 to Kutaragi, entitled Apparatus For Controlling CD Audio Player To Playback CD-ROM, U.S. Pat. No. 5,270,829 to Yang, entitled Automatically Reserve-Recording And Reserve-Playing Back A Broadcasted Program, U.S. Pat. No. 5,293,357 to Hallenbeck, entitled Method And Apparatus For Controlling A Television Program Recording Device, U.S. Pat. No. 5,499,102 to Hashimoto, entitled Display Device For Videocassette Recorder Recording Reservations, U.S. Pat. No. 5,646,603 to Nagatae al., entitled Remote Control Apparatus For Recording/Playback Equipment, U.S. Pat. No. 5,657,414 to Lett et al., entitled Auxiliary Device Control For A Subscriber Terminal, and U.S. Pat. No. 5,682,456 to Ishiguchi et al., entitled VCR Operating Apparatus Having Multi-Function Keypad Enabling.

SUMMARY OF THE INVENTION

To solve the above problems, it is an object of the present invention to provide a broadcast program reserve-recording apparatus using a remote transceiver, which can reserve-record a broadcast program having a remote transceiver having a display without turning a TV or VCR fully on.

To accomplish the above object of the present invention, there is provided a broadcast program reserve-recording apparatus, including: a main body for receiving and storing broadcast program information contained in a broadcast signal transmitted from each of a plurality of broadcast stations, transmitting the stored broadcast program information according to a received reserve recording key signal, receiving reserve-recording information, and setting reserve-recording; and a remote transceiver having a display, for displaying the broadcast program information received from the main body on the display, in correspondence with the reserve-recording key signal transmitted to the main body, and transmitting reserve-recording information, selected from among the displayed broadcast program information, to the main body.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A preferred embodiment of the present invention will be described in detail with reference to the accompanying drawings.

Figure 1:
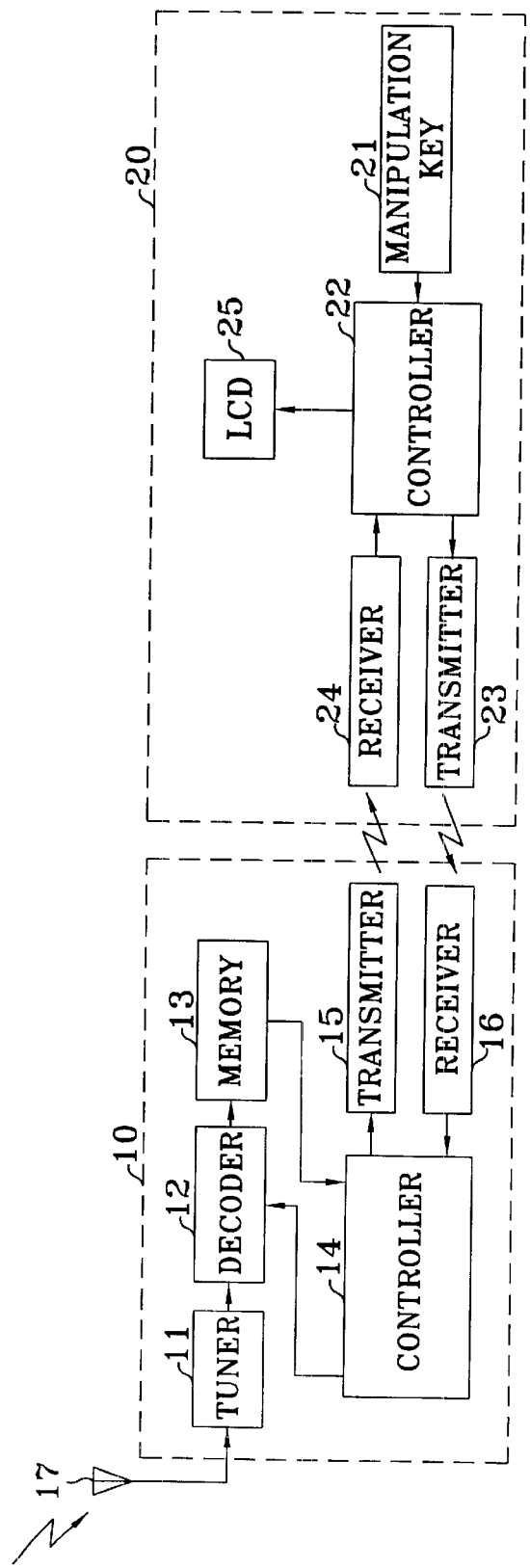
FIG. 1 is a block diagram a broadcast program reserve-recording apparatus according to a preferred embodiment of the present invention.

The apparatus of FIG. 1 includes a main body 10 which receives a broadcast signal via an antenna 17 and a remote transceiver 20 which communicates with the main body 10. The main body 10 is a TV or VCR, and the remote transceiver 20 is a remote controller having a display. The main body 10 and the remote transceiver 20 can communicate with each other using an infrared ray (IR) or radio frequency (RF) signal.

A tuner 11 in the main body 10 receives a broadcast signal via the antenna 17 and outputs the tuned signal to a decoder 12. The decoder 12 separates broadcast program information from the received broadcast signal and supplies the separated broadcast program information to a memory 13. The broadcast program information is VPS data or KBPS data representing the program title and broadcast time to be broadcast by each broadcast station. The memory 13 stores the separated broadcast program information.

A controller 14 reads the broadcast program information stored in the memory 13, transmits the read information to a remote transceiver 20 via a transmitter 15, and receives reserve-recording information transmitted from the remote transceiver 20 via a receiver 16.

The remote transceiver 20 includes a manipulation key 21 for reserve-recording, a display 25 and a controller 22. The controller 22 controls the main body 10 to communicate with the remote transceiver 20 in response to the key signal of the manipulation key 21 and the communication result to be displayed on the display 25. A transmitter 23 and a receiver 24 in the remote transceiver 20 send and receive a signal in correspondence with the receiver 16 and the transmitter 15 in the main body 10, respectively. In this embodiment, the display 25 in the remote transceiver 20 is a liquid crystal display (LCD), for example.

Figure 2:
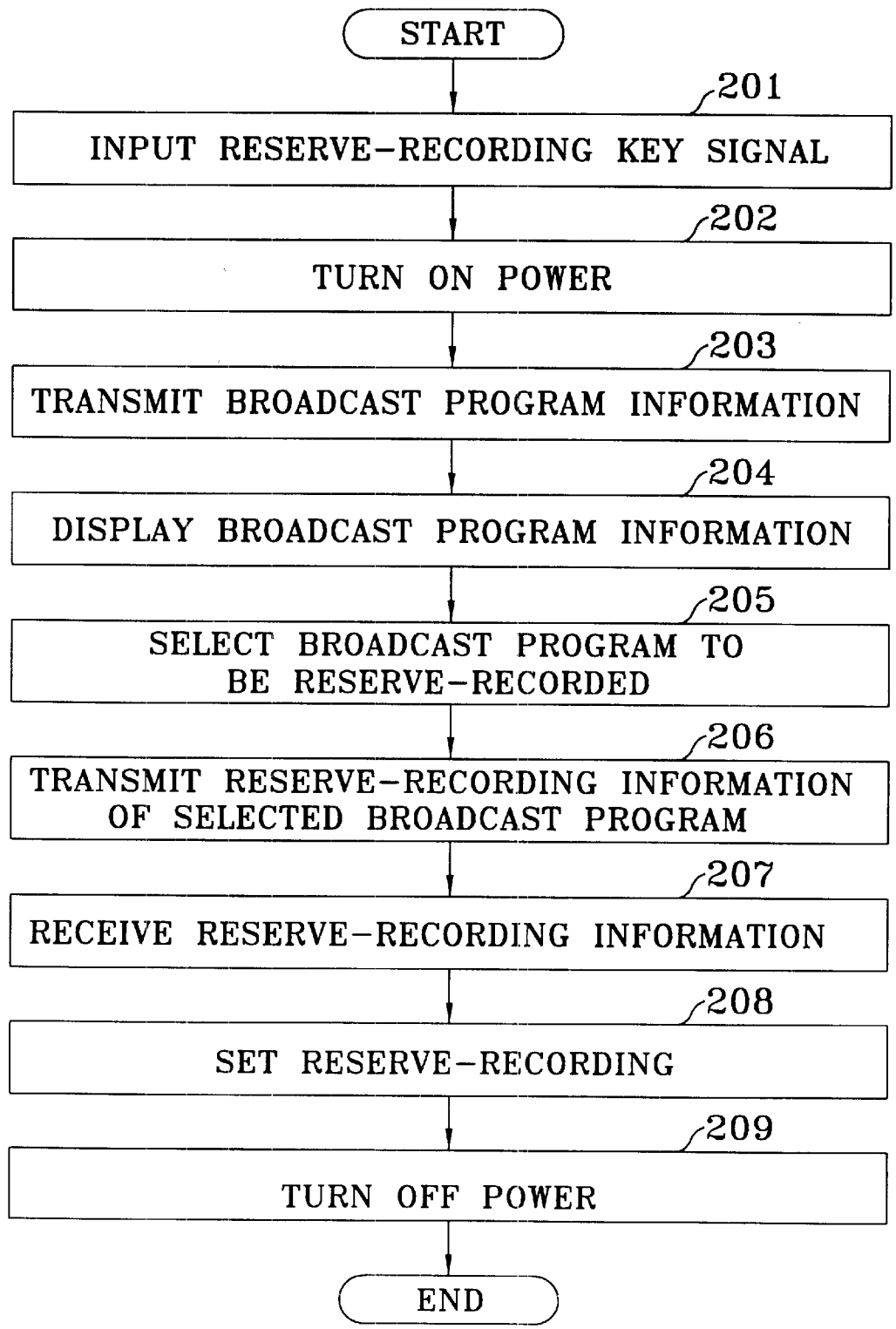
FIG. 2 is a flowchart illustrating the operation of the apparatus shown in FIG. 1.

The operation of the apparatus shown in FIG. 1 having the above structure will be described with reference to the flowchart of FIG. 2.

For reserve-recording, a user inputs a reserve-recording key signal via the manipulation key 21 in the remote transceiver 20 (step 201). The remote transceiver 20 usually maintains a power-off state. The controller 22 in the remote transceiver 20 turns the apparatus on, in response to the reserve-recording key signal input from the manipulation key 21 so that the elements thereof, such as the display 25, can operate (step 202). Also, the controller 22 transmits a signal indicating that the reserve-recording key signal has been input, to the main body 10 via the transmitter 23. When the receiver 16 receives the signal transmitted from the remote transceiver 20, the controller 14 in the main body 10 turns on the main body 10 so as to provide the minimum power necessary for transmission and reception (step 202). The tuner 11 in the main body 10 receives a broadcast signal and the decoder 12 separates broadcast program information from the received broadcast signal. The separated broadcast program information is stored in the memory 13. The controller 14 transmits the broadcast program information stored in the memory 13 to the remote transceiver 20 via the transmitter 16 (step 203). When the receiver 24 in the remote transceiver 20 receives the broadcast program information transmitted from the main body 10, the controller 22 causes the received broadcast program information to be displayed on the display 25 (step 204). On watching the broadcast program information displayed on the display 25, the user selects a desired broadcast program for reserve-recording via the manipulation key 21 (step 205). The controller 22 transmits the reserve-recording information with respect to the broadcast program selected via the manipulation key 21 to the main body 10 via the transmitter 23 (step 206). When the receiver 16 receives the reserve-recording information from the remote transceiver 20 (step 207), the controller 14 in the main body 10 sets reserve-recording according to the received reserve-recording information (step 208), and then turns the main body 10 off (step 209).

As described above, the broadcast program reserve-recording apparatus using a remote transceiver according to the present invention can perform reserve-recording of a broadcast program without turning a TV or VCR fully on.

While only a certain embodiment of the invention has been specifically described herein, it will be apparent that numerous modifications may be made thereto without departing from the spirit and scope of the present invention.

What is claimed is:

1. A broadcast program reserve-recording apparatus, comprising:
    a main body for receiving and storing broadcast program information, transmitting the stored broadcast program information according to a received reserve-recording key signal, receiving reserve-recording information, and setting reserve-recording; and
    a remote transceiver having a display, for displaying the broadcast program information received from the main body on the display, and for transmitting reserve-recording information, selected from among the displayed broadcast program information to the main body, the main body turning on with a minimum power necessary for communication accommodating the main body transmitting the broadcast information to the remote transceiver and the main body receiving the reserve-recording information from the remote transceiver.

2. The broadcast program reserve-recording apparatus according to claim 1, said main body comprising:
    a tuner for selecting a broadcast signal from each of said plurality of broadcast stations;
    a decoder for separating broadcast program information contained in the selected broadcast signal;
    a memory for storing the separated broadcast program information therein;
    a controller for turning power on according to the received reserve-recording key signal, outputting broadcast program information stored in the memory, setting reserve-recording according to the received reserve-recording information, and turning power off,
    a transmitter for transmitting the broadcast program information output from said controller to the remote transceiver; and
    a receiver for receiving the reserve-recording key signal and the reserve-recording information which are transmitted from said remote transceiver.

3. The broadcast program reserve-recording apparatus according to claim 2, said controller turning on said main body on so as to provide a minimum power necessary for communication.

4. The broadcast program reserve-recording apparatus according to claim 1, said remote transceiver comprising:
    a manipulation key for selecting a reserve-recording function and a broadcast program to be reserve-recorded;
    a receiver for receiving the broadcast program information transmitted from said main body;
    a controller for outputting the reserve-recording key signal input from said manipulation key, and for outputting, as reserve-recording information, information on the title and broadcast time concerning the broadcast program selected via said manipulation key from among the broadcast program information displayed on the display; and
    a transmitter for transmitting the reserve-recording key signal and the reserve-recording information output from said controller to said main body.

5. The broadcast program reserve-recording apparatus according to claim 2, said remote transceiver comprising:
    a manipulation key for selecting a reserve-recording function and a broadcast program to be reserve-recorded;
    a receiver for receiving the broadcast program information transmitted from said main body;
    a controller for outputting the reserve-recording key signal input from said manipulation key, and for outputting, as reserve-recording information, information on the title and broadcast time concerning the broadcast program selected via said manipulation key from among the broadcast program information displayed on the display; and
    a transmitter for transmitting the reserve-recording key signal and the reserve-recording information output from said controller to said main body.

6. The broadcast program reserve-recording apparatus according to claim 3, said remote transceiver comprising:
    a manipulation key for selecting a reserve-recording function and a broadcast program to be reserve-recorded;
    a receiver for receiving the broadcast program information transmitted from said main body;
    a controller for outputting the reserve-recording key signal input from said manipulation key, and for outputting, as reserve-recording information, information on the title and broadcast time concerning the broadcast program selected via said manipulation key from among the broadcast program information displayed on the display; and a transmitter for transmitting the reserve-recording key signal and the reserve-recording information output from said controller to said main body.

7. The broadcast program reserve-recording apparatus according to claim 4, said display comprising a liquid crystal display.

8. The broadcast program reserve-recording apparatus according to claim 2, said display comprising a liquid crystal display.

9. The broadcast program reserve-recording apparatus according to claim 3, said display comprising a liquid crystal display.

10. The broadcast program reserve-recording apparatus according to claim 5, said display comprising a liquid crystal display.

11. The broadcast program reserve-recording apparatus according to claim 6, said display comprising a liquid crystal display.

12. The broadcast program reserve-recording apparatus according to claim 1, said remote transceiver comprising a remote controller.

13. The broadcast program reserve-recording apparatus according to claim 2, said remote transceiver comprising a remote controller.

14. The broadcast program reserve-recording apparatus according to claim 3, said remote transceiver comprising a remote controller.

15. The broadcast program reserve-recording apparatus according to claim 4, said remote transceiver comprising a remote controller.

16. The broadcast program reserve-recording apparatus according to claim 7, said remote transceiver comprising a remote controller.

17. The broadcast program reserve-recording apparatus according to claim 11, said remote transceiver comprising a remote controller including communication with the main body by any one of infrared and radio frequency signals.

18. A reserve-recording control method for controlling a main body which reserve-records selected broadcast program from among broadcast programs contained in a received broadcast signal, by using a remote transceiver having a display, the reserve-recording control method comprising:

transmitting a reserve-recording key signal for a reserve-recording mode to the main body from the remote transceiver;

displaying a broadcast program information received from the main body according to the reserve-recording key signal on the display; and transmitting the broadcast program information selected by a user from among the broadcast program information displayed on the display to the main body from the remote transceiver.

19. The broadcast program reserve-recording apparatus according to claim 1, said main body comprising one of a TV or VCR.

20. The broadcast program reserve-recording apparatus according to claim 2, said main body comprising one of a TV or VCR.

21. The broadcast program reserve-recording apparatus according to claim 3, said main body comprising one of a TV or VCR.

22. The broadcast program reserve-recording apparatus according to claim 4, said main body comprising one of a TV or VCR.

23. The broadcast program reserve-recording apparatus according to claim 7, said main body comprising one of a TV or VCR.

24. The broadcast program reserve-recording apparatus according to claim 12, said main body comprising one of a TV or VCR.

25. The method of claim 18, further comprising the step of providing a minimum power necessary for communication to the main body when the reserve-recording key signal is received by the main body.

26. The method of claim 25, further comprising the step of turning off the minimum power necessary for communication to the main body after the broadcast program information selected by the user is received by the main body from the remote transceiver and the main body sets the reserve-recording according to the received reserve-recording information.

27. A reserve-recording control method for controlling a main body reserve-recording selected broadcast program from among broadcast programs contained in a received broadcast signal, by using a remote transceiver having a display, the reserve-recording control method comprising:

inputting a reserve-recording key signal through a manipulation key in said remote transceiver;

turning on said remote transceiver with said display in response to said reserve-recording key signal input from said manipulation key;

transmitting a signal indicating said reserve-recording key signal has been input from said remote transceiver to said main body;

turning on said main body with a minimum power necessary for transmission and reception when said main body receives said reserve-recording key signal from said remote transceiver;

receiving the broadcast signal in said main body;

separating broadcast program information from the broadcast signal in said main body;

storing the broadcast program information in a memory of said main body;

transmitting broadcast program information stored in said memory of said main body to said remote transceiver;

displaying on said remote transceiver the received broadcast program information when said remote transceiver receives the broadcast program information;

selecting a reserve-recording information by a user selecting a desired broadcast program for reserve-recording through said manipulation key;

transmitting the reserve-recording information with respect to the broadcast program selected through said manipulation key from said remote transceiver to said main body;

setting a reserve-recording in said main body according to the received reserve-recording information when said main body receives the reserve-recording information from said remote transceiver; and turning off of said main body after setting the reserve recording in said main body.

* * * * *